(12) United States Patent
Wiederin et al.

(10) Patent No.: US 12,009,195 B2
(45) Date of Patent: Jun. 11, 2024

(54) SYSTEMS AND METHODS FOR SECURING FABRIC, PAPER, AND FILM SAMPLES FOR ANALYSIS BY LASER ABLATION

(71) Applicant: Elemental Scientific, Inc., Omaha, NE (US)

(72) Inventors: Daniel R. Wiederin, Omaha, NE (US); Ross Coenen, Omaha, NE (US); Mark Casper, Blair, NE (US)

(73) Assignee: Elemental Scientific, Inc., Omaha, NE (US)

( * ) Notice: Subject to any disclaimer, the term of this patent is extended or adjusted under 35 U.S.C. 154(b) by 398 days.

(21) Appl. No.: 17/381,949

(22) Filed: Jul. 21, 2021

(65) Prior Publication Data

US 2022/0028675 A1    Jan. 27, 2022

Related U.S. Application Data

(60) Provisional application No. 63/055,073, filed on Jul. 22, 2020.

(51) Int. Cl.
*H01J 49/04* (2006.01)
*G01N 1/04* (2006.01)

(52) U.S. Cl.
CPC ............ *H01J 49/0409* (2013.01); *G01N 1/04* (2013.01); *G01N 2001/045* (2013.01)

(58) Field of Classification Search
CPC ............... G01N 1/04; G01N 2001/045; G01N 2001/2886; H01J 49/0409; H01J 49/0418; H01J 49/0463; H01L 22/32; H01L 23/481; H01L 24/05; H01L 27/14621; H01L 27/14623; H01L 27/14627; H01L 27/14632; H01L 27/14636; H01L 27/1464; H01L 27/14685; A61B 2505/03; A61B 2505/09; A61B 5/02; A61B 5/369; A61B 5/389; G02B 27/01; G06F 3/014; G06F 3/015; G06Q 50/10; G06T 19/006
USPC ......................................................... 356/244
See application file for complete search history.

(56) References Cited

U.S. PATENT DOCUMENTS

| 5,451,375 A | 9/1995 | Solazzi |
| 2009/0028760 A1 | 1/2009 | Solazzi |
| 2016/0194590 A1 | 7/2016 | Loboda |
| 2021/0239707 A1* | 8/2021 | Loboda ................... G01N 1/28 |

FOREIGN PATENT DOCUMENTS

| JP | 2011079063 A | 4/2011 |
| KR | 20080113508 A | 12/2008 |

OTHER PUBLICATIONS

PCT International Search Report and Written Opinion for PCT/US2021/042590, dated Nov. 10, 2021.

* cited by examiner

*Primary Examiner* — Tri T Ton
(74) *Attorney, Agent, or Firm* — Kevin E. West; Advent, LLP

(57) ABSTRACT

Systems and methods are described for securing fabric, paper, and film samples for analysis by laser ablation. A method embodiment includes, but is not limited to, securing a thin, solid sample with a sample holder system, the sample holder system configured to hold the thin, solid sample in a taut configuration between a piston and a sample holder base; transferring the sample holder system to a laser ablation system; and ablating at least a portion of the thin, solid sample in the taut configuration with the laser ablation system to provide an ablated sample.

12 Claims, 4 Drawing Sheets

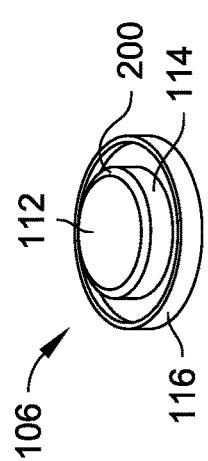 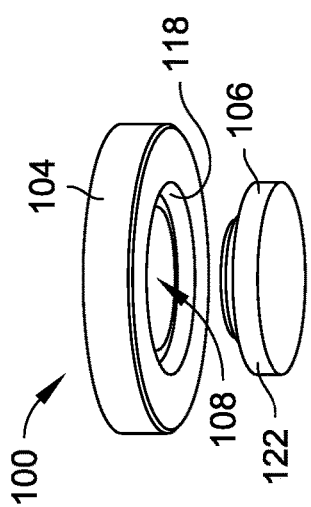 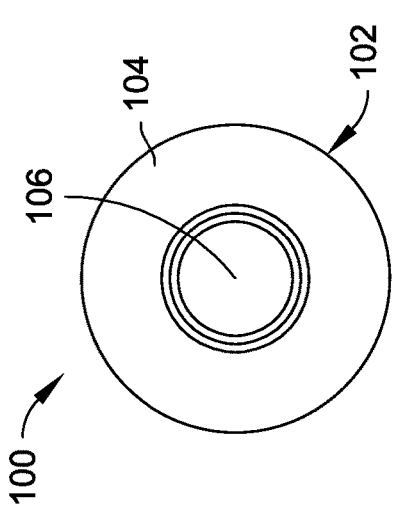
FIG. 2A  FIG. 2B  FIG. 2C
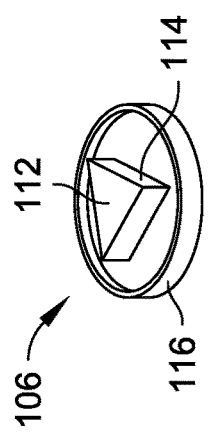 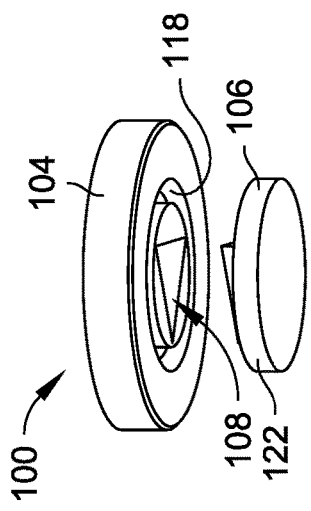 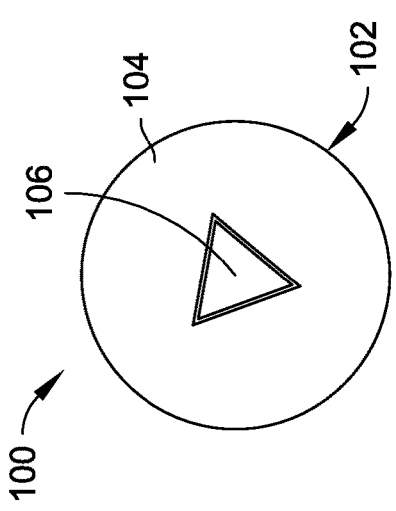
FIG. 3A  FIG. 3B  FIG. 3C
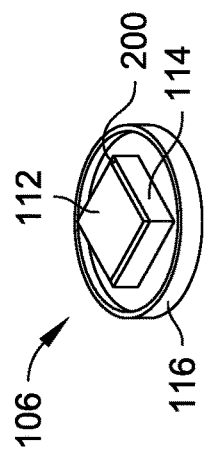 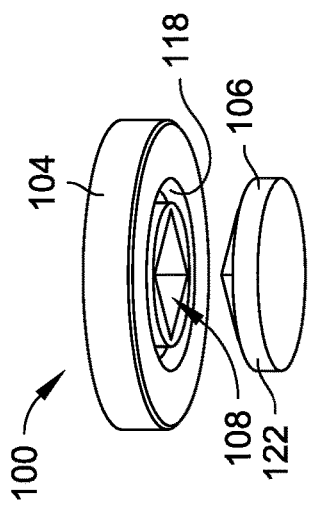 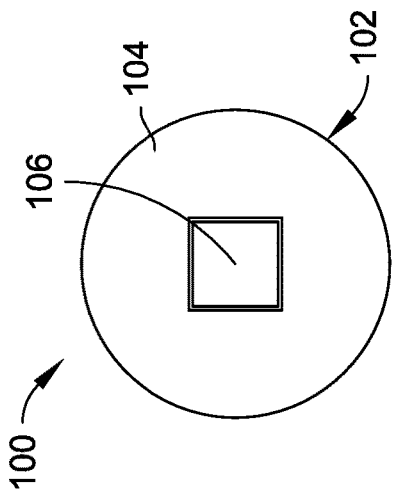
FIG. 4A  FIG. 4B  FIG. 4C

SYSTEMS AND METHODS FOR SECURING FABRIC, PAPER, AND FILM SAMPLES FOR ANALYSIS BY LASER ABLATION

CROSS-REFERENCE TO RELATED APPLICATIONS

The present application claims the benefit of 35 U.S.C. § 119(e) of U.S. Provisional Application Ser. No. 63/055,073, filed Jul. 22, 2020, and titled "SYSTEMS AND METHODS FOR SECURING FABRIC, PAPER, AND FILM SAMPLES FOR ANALYSIS BY LASER ABLATION." U.S. Provisional Application Ser. No. 63/055,073 is herein incorporated by reference in its entirety.

BACKGROUND

Laser Ablation Inductively Coupled Plasma Mass Spectrometry (LA-ICPMS) and Laser Ablation Inductively Coupled Plasma Optical Emission Spectrometry (LA-ICP-OES) techniques can be used to analyze the composition of a target, such as a solid or liquid target material. Often, a sample of the target is provided to an analysis system in the form of an aerosol (i.e., a suspension of solid and possibly liquid particles and/or vapor in a carrier gas, such as helium gas). The sample is typically produced by arranging the target within a laser ablation chamber, introducing a flow of a carrier gas within the chamber, and ablating a portion of the target with one or more laser pulses to generate a plume containing particles and/or vapor ejected or otherwise generated from the target, suspended within the carrier gas. Entrained within the flowing carrier gas, the target material is transported to an analysis system via a transport conduit to an inductively coupled plasma (ICP) torch where it is ionized.

A plasma containing the ionized particles and/or vapor is then analyzed by an analysis system, such as a mass spectrometry (MS), optical emission spectrometry (OES), isotope ratio mass spectrometry (IRMS), or electro-spray ionization (ESI) system. For example, ICP spectrometry is an analysis technique commonly used for the determination of trace element concentrations and isotope ratios in liquid samples. ICP spectrometry employs electromagnetically generated partially ionized argon plasma which reaches a temperature of approximately 7,000K. When a sample is introduced to the plasma, the high temperature causes sample atoms to become ionized or emit light. Since each chemical element produces a characteristic mass or emission spectrum, measuring the spectra of the emitted mass or light allows the determination of the elemental composition of the original sample.

SUMMARY

Systems and methods are described for securing fabric, paper, and film samples for analysis by laser ablation. A method embodiment includes, but is not limited to, securing a thin, solid sample with a sample holder system, the sample holder system configured to hold the thin, solid sample in a taut configuration between a piston and a sample holder base; transferring the sample holder system to a laser ablation system; and ablating at least a portion of the thin, solid sample in the taut configuration with the laser ablation system to provide an ablated sample.

A method embodiment includes, but is not limited to, directing a laser from a laser ablation system onto a thin, solid sample in a taut configuration held in a taut configuration by a sample holder system to provide an ablated sample, the sample holder system configured to hold the thin, solid sample in the taut configuration between a piston and a sample holder base; transferring the ablated sample via a carrier gas to a sample analysis system; and analyzing the content of the ablated sample with the sample analysis system.

A system embodiment includes, but is not limited to, a sample holder base defining an aperture via one or more sidewalls; and a piston having a projection with one or more sidewalls sized and dimensioned to fit within at least a portion of the aperture to secure a thin, solid sample between the one or more sidewalls of the sample holder base and the one or more sidewalls of the piston.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DRAWINGS

The Detailed Description is described with reference to the accompanying figures.

FIG. 2A is a diagrammatic illustration of a piston having a circular portion to couple with a circular aperture of a sample holder base of the system of FIG. 1A.

FIG. 2B is a diagrammatic illustration of an exploded view of a bottom portion of the piston of FIG. 2A aligned with a circular aperture of a sample holder base.

FIG. 2C is a diagrammatic illustration of a top view of the piston of FIG. 2A inserted into a circular aperture of a sample holder base.

FIG. 3A is a diagrammatic illustration of a piston having a triangular portion to couple with a triangular aperture of a sample holder base.

FIG. 3B is a diagrammatic illustration of an exploded view of a bottom portion of the piston of FIG. 3A aligned with a triangular aperture of a sample holder base.

FIG. 3C is a diagrammatic illustration of a top view of the piston of FIG. 3A inserted into a triangular aperture of a sample holder base.

FIG. 4A is a diagrammatic illustration of a piston having a square portion to couple with a square aperture of a sample holder base.

FIG. 4B is a diagrammatic illustration of an exploded view of a bottom portion of the piston of FIG. 4A aligned with a square aperture of a sample holder base.

FIG. 4C is a diagrammatic illustration of a top view of the piston of FIG. 4A inserted into a square aperture of a sample holder base.

DETAILED DESCRIPTION

Overview

Figure 1C:
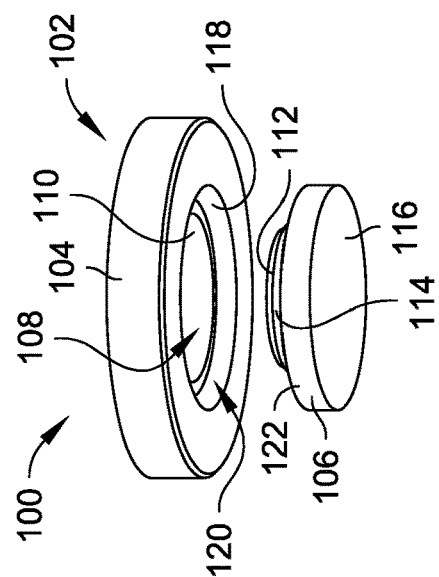
FIG. 1C is a diagrammatic illustration of an exploded view of a bottom portion of the system of FIG. 1A.
Figure 1B:
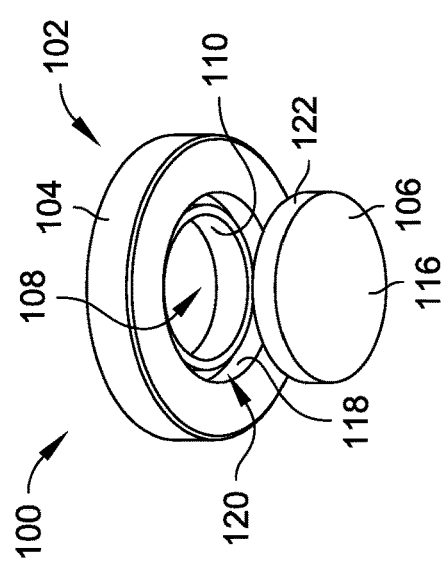
FIG. 1B is a diagrammatic illustration of an exploded view of a bottom portion of the system of FIG. 1A.
Figure 1A:
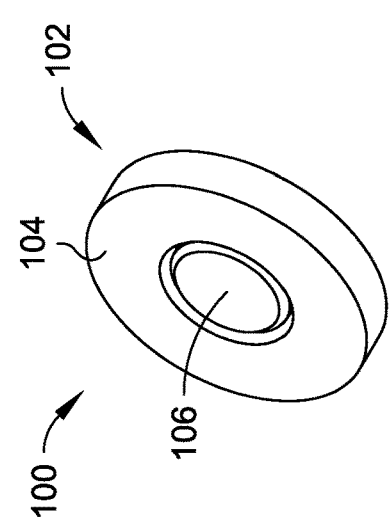
FIG. 1A is a diagrammatic illustration of a system for preparing stable, planar samples for laser ablation from fabric, paper, and film samples, in accordance with example implementations of the present disclosure.

Laser ablation is a sampling method which uses a focused beam of pulsed laser light to convert a portion of a solid or liquid sample from a target object into aerosol phase which is transported on a gas stream (e.g., a carrier gas) into an analyzer, such as an Inductively Coupled Plasma Mass Spectrometer (ICPMS). Multiple laser pulses may be used to ablate different areas of the sample to produce adequate signal and to ensure that a representative sample has been collected for analysis. Nonplanar objects can provide challenges in providing samples for conventional sample cells used by laser ablation systems, such as by including surfaces that are not normal to the laser beam or otherwise not positioned to facilitate ablation (e.g., a portion of the surface is in an unfocused region of the laser beam), by including samples that may not physically fit within the confines of the sample cell, and the like.

Planarized objects can be desirable to easily focus the laser on the sample and raster to ablate a representative portion and generate analytical data. Planarization of a sample can be facilitated by methods such as by cutting and polishing a sample to make it flat, by grinding a sample, possibly mixing it with a binder, then pressing the ground portions into a flat disk, or by collecting sample on a filter paper (e.g., such as for liquid samples). However, such planarization techniques typically are not suitable for fabrics, papers, and films that have thin thickness profiles and can involve damaging the source of the material for the sample. Such planarization techniques can require a time consuming preparation process, can involve a method that is difficult to protect a sample from contamination sources, and the like. Moreover, current planarization techniques do not account for differences in thickness of various fabric, paper, and film samples that are handled by a laser ablation system for analysis.

Accordingly, in one aspect, the present disclosure is directed to systems and methods for securing fabric, paper, and film samples in planar configurations for laser ablation and subsequent content analysis (e.g., via one or more spectroscopy techniques). A system can include a sample holder base defining an aperture into which a piston can be inserted to hold a fabric, paper, or film sample in a taut configuration, fixed in place with at least a portion of the sample friction-fit between sidewalls of the aperture and the piston. The distance between sidewalls of the aperture and the piston can facilitate the types of materials held in place by the system, such as by accounting for the thickness of the sample material, the compressibility of the sample material, and the like.

In implementations, the distance between sidewalls of the aperture and the piston is varied to support the handling of multiple sample types, such as for fabrics, papers, and films having differing material thicknesses. For example, the system can include multiple piston sizes for a given aperture size of the sample holder base to provide different distances between sidewalls of the aperture and the pistons. Alternatively or additionally, the system can include multiple sample holder bases having different aperture sizes to provide different distances between sidewalls of the aperture and the pistons. In operation, a thin, solid sample is positioned between an aperture of the sample holder base and the top of a piston. The piston and the aperture are brought together (e.g., via inserting the piston into the aperture) to cause the thin, solid sample to have at least a portion of the sample friction fit between sidewalls of the aperture and the piston to provide a substantially planar and taut configuration for the sample. In implementations, the top surface of the piston is substantially flat to provide a planar area to support the thin, solid sample when the piston and aperture are brought together.

The sample holder having a thin, solid sample in the taut configuration is then placed into position adjacent to or within a sample cell of a laser ablation system to make the sample available to the laser for ablation. In implementations, a coating material is sprayed onto the fixed sample at the time of sampling to provide a layer to protect against potential contamination during transport or storage of the sample. A plurality of sample support holders having samples in the taut configuration can be stored in one or more vertically-stacked arrangements while maintaining physical separation between the sample and the adjacent sample holder base (e.g., to avoid potential contamination or loss of sample). A robotic arm can remove one of the sample holders (e.g., a top structure of the vertically-stacked arrangement, a bottom structure of the vertically-stacked arrangement, etc.) for introduction to the sample cell of the laser ablation system.

Example Implementations

Referring generally to FIGS. 1 through 9B, systems 100 are shown for preparing a taut and planarized sample from a thin, solid sample for laser ablation. The system 100 generally includes a sample holder 102 having a sample holder base 104 and a piston 106. The sample holder can receive a flexible, thin sample including, but not limited to, a fabric, a paper, a film, and combinations thereof, and present the sample in a taut and planarized configuration for laser ablation and subsequent analysis. For instance, following ablation of the taut and planarized sample, the ablated sample is transferred to an analytical system via a carrier gas. The analytical system used to analyze the composition of ablated sample from the laser ablation system can include, but is not limited to, ICP emission spectroscopy, ICPMS, optical spectroscopy, laser-induced breakdown spectroscopy (LIBS), infrared (IR) spectrometry, and combinations thereof.

The sample holder base 104 defines an aperture 108 via sidewalls 110. The piston 106 includes a projection 112 having sidewalls 114, where the projection 112 is sized and dimensioned to fit within at least a portion of the aperture 108 of the sample holder base 104. For example, a thin, solid sample, such as a fabric, a paper, a film, or other material having flexible characteristics, can be introduced between the projection 112 and the aperture 108 and manipulated by the sample holder 102 into a taut configuration when the projection 112 of the piston 106 is introduced into the aperture 108. The taut configuration of the sample can include at least a portion of the sample fixed between the sidewalls 110 and the sidewalls 114 (e.g., via friction fit). In implementations, the piston 106 includes the projection 112 projecting outwardly from a base 116 that can interact with the sample holder base 104 to secure the piston 106 with the sample holder base 104. For example, the sample holder base 104 can include interior sidewalls 118 defining an interior region 120 that corresponds to sidewalls 122 of the base 116 to receive the base 116 within the interior region 120 when the projection 112 extends into the aperture 108.

The sample holder base 104 and the piston 106 can be formed in a variety of corresponding shapes to provide a friction fit of a thin, solid sample between the sidewalls 110 of the sample holder base 104 and the sidewalls 114 of the piston 106. For example, referring to FIGS. 2A through 2C, the sample holder base 104 is shown having a circular aperture 108 and the piston 106 is shown having a circular projection 112 with a tapered edge 200. As another example, referring to FIGS. 3A through 3C, the sample holder base 104 is shown having a triangular aperture 108 and the piston 106 is shown having a triangular projection 112. As another example, referring to FIGS. 4A through 4C, the sample holder base 104 is shown having a rectangular (e.g., square) aperture 108 and the piston 106 is shown having a rectangular (e.g., square) projection 112 with a tapered edge 200. The system 100 can include any complementary shape between the aperture 108 and the projection 112 and is not limited to the example shapes provided in the embodiments described herein. In implementations, the top surface of the piston 106 (e.g., a top surface of the projection 112) is substantially flat to provide a planar area to support the thin, solid sample when the piston 106 and aperture 108 are brought together, such as to provide the taut configuration. The planar area can support the taut configuration of the thin, solid sample to provide an area for laser ablation that is substantially normal to the laser.

Figure 5A:
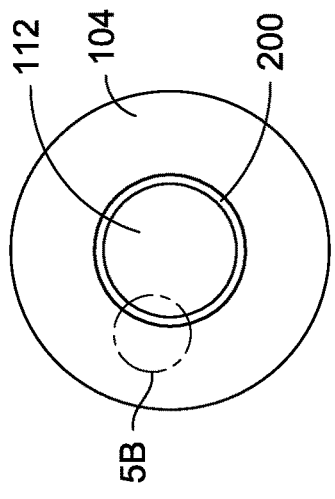
FIG. 5A is a diagrammatic illustration of a top view of the piston inserted into the aperture of the sample holder base with a first distance between sidewalls of the piston and the sampler holder base.
Figure 5B:
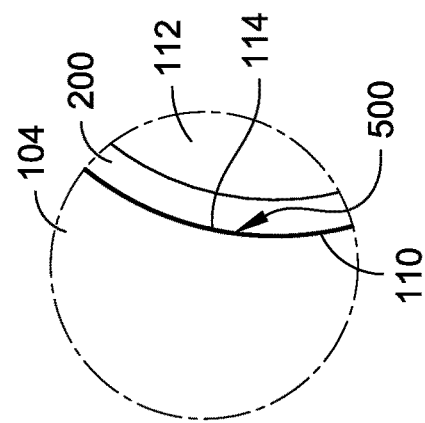
FIG. 5B is an enlarged view of the portion labeled 5B in FIG. 5A.
Figure 6A:
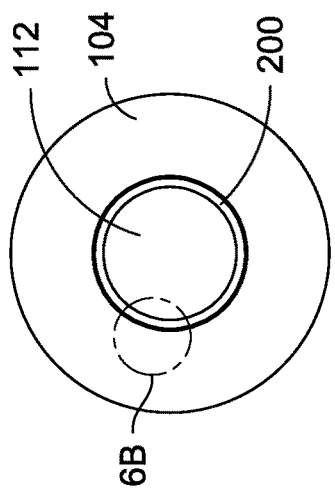
FIG. 6A is a diagrammatic illustration of a top view of the piston inserted into the aperture of the sample holder base with a second distance between sidewalls of the piston and the sampler holder base.
Figure 6B:
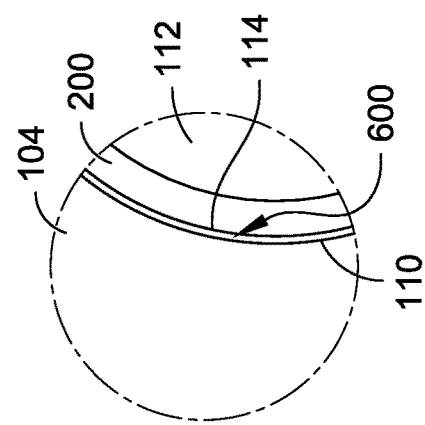
FIG. 6B is an enlarged view of the portion labeled 6B in FIG. 6A.
Figure 7A:
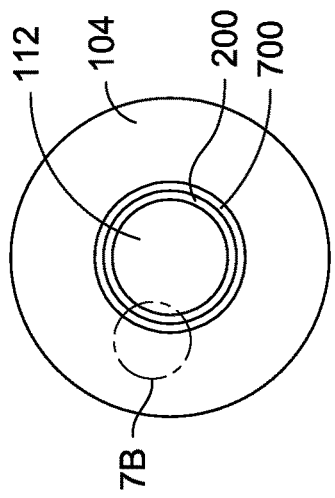
FIG. 7A is a diagrammatic illustration of a top view of the piston inserted into the aperture of the sample holder base with a third distance between sidewalls the piston and the sampler holder base.
Figure 7B:
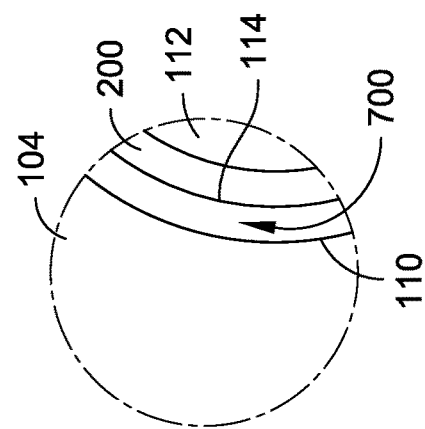
FIG. 7B is an enlarged view of the portion labeled 7B in FIG. 7A.

The system 100 can facilitate multiple types and thicknesses of samples to be presented to a laser ablation system in/about a sample cell to introduce the laser to the sample held in the sample holder 102. For example, the distance between the sidewalls 110 of the sample holder base 104 and the sidewalls 114 of the piston 106 can vary depending on the types of materials held in place by the system 100, where such materials can differ on the basis of thickness of the sample material, compressibility of the sample material, and the like. In implementations, the distance between the sidewalls 110 of the sample holder base 104 and the sidewalls 114 of the piston 106 is varied between differing sample holder base 104 and piston 106 configurations to support the handling of multiple sample types. For example, the system can include multiple piston sizes for a given aperture size of the sample holder base 104 to provide different distances between sidewalls of the aperture 108 and the pistons 106. Alternatively or additionally, the system can include multiple sample holder bases having different aperture sizes to provide different distances between sidewalls of the aperture 108 and one or more pistons 106. Example gaps are shown between the sidewalls 110 of the sample holder base 104 and the sidewalls 114 of the piston 106 in FIGS. 5A through 7B, where FIGS. 5A and 5B illustrate a first gap 500 between the respective sidewalls, FIGS. 6A and 6B illustrate a second gap 600 between the respective sidewalls, and FIGS. 7A and 7B illustrate a third gap 700 between the respective sidewalls. The first gap 500 provides the smallest distance between the respective sidewalls and the third gap 700 provides the largest distance between the respective sidewalls, with the second gap 600 providing an intermediate distance between the respective sidewalls. In implementations, the gap between the respective sidewalls is less than about 1 mm. For example, the gap between the respective sidewalls can be from about 0 mm to about 1 mm to facilitate differing material types and thicknesses. However, the system 100 is not limited to such gap dimensions and can include gaps that exceed about 1 mm. Example material types and thicknesses for different configurations of piston 106 and sample holder base 104 are provided in the following Table 1 based on example gaps between the sidewalls 110 and the sidewalls 114:

TABLE 1

| Wall Gap (mm) | Sample Material Examples |
| --- | --- |
| 1 | very thick fabric (approx. 0.9 mm-1.5 mm thick) |
| 0.5 | thick fabric (approx. 0.5 mm-0.9 mm thick) |
| 0.25 | medium fabric (approx. 0.2 mm-0.9 mm thick) |
| 0.125 | paper or thin fabric (approx. 0.05 mm-0.2 mm thick) |
| 0 | very thin fabric or films (less than approx. 0.05 mm) |

The system 100 can include a coating to secure one or more samples held by the sample holder 102. For example, an adhesive coating can be sprayed onto or otherwise applied to the piston 106 prior to and/or subsequent to interaction between the piston 106 and the object to be sampled. Alternatively or additionally, the adhesive coating can be applied to the sample holder 102 prior to and/or subsequent interaction between the sample holder base 104 and the piston 106 with the sample therebetween. The coating can secure the sample during storage and transport of the sample between a testing site and a laboratory site, from a storage site to the laser ablation system, or the like. For example, the coating can prevent loss of sample, can prevent oxidation or contamination of the sample during transport and storage, and the like. A blank sample holder 102 having no thin, solid sample held thereby can be introduced to the analytical system to generate a signal corresponding to a content of the blank sample holder. Where a coating is introduced to the system 100, the blank sample holder 102 can include the coating to generate a signal corresponding to a content of the blank sample holder with the coating. The signal from the blank sample holder 102 can then be subtracted from the signal generated by the analytical system corresponding to the laser ablated sample held by the system to provide the content of the sample without the effects of the sample holder 102 or coating. Alternatively or additionally to a coating, the system 100 can include a holder configured to couple to or enclose at least a portion of the sample holder 102 to isolate the sample held thereby from the external environment of the system 100, such as to prevent loss or contamination of the sample during storage and transport of the sample between a testing site and a laboratory site, from a storage site to the laser ablation system, or the like.

Figure 9A:
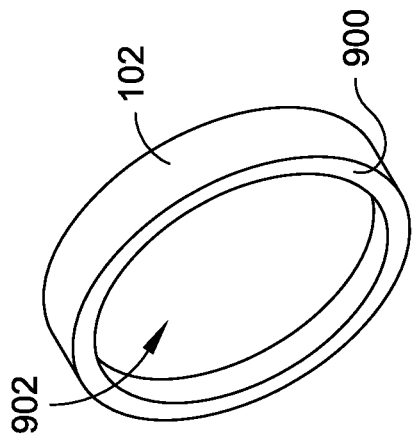
FIG. 9A is a diagrammatic illustration of a sample holder base having a rim to separate the sample holder base from another sample holder base when in a vertically-stacked arrangement.
Figure 9B:
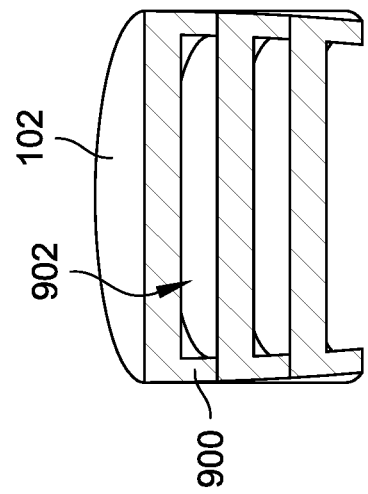
FIG. 9B is a diagrammatic illustration of a cross-sectional view of a plurality of sample holder bases of FIG. 9A provided in a vertically-stacked arrangement.
Figure 8A:
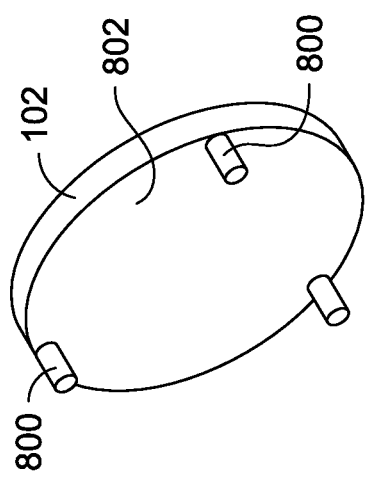
FIG. 8A is a diagrammatic illustration of a sample holder base having a plurality of pins to separate the sample holder base from another sample holder base when in a vertically-stacked arrangement.
Figure 8B:
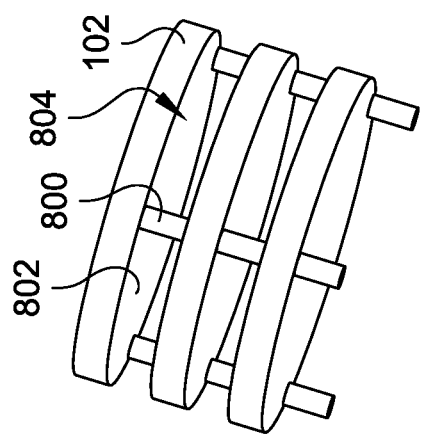
FIG. 8B is a diagrammatic illustration of a plurality of sample holder bases of FIG. 8A provided in a vertically-stacked arrangement.

In implementations, the system 100 can facilitate stacking of multiple sample holders 102 to store multiple samples in a configuration to be positioned by an automatic sample handler of the laser ablation system while maintaining physical separation of the taut sample of one sample holder 102 with the structure or sample of an adjacent stacked sample holder 102. Referring to FIGS. 8A and 8B, the sample holder 102 can include a plurality of pins 800 projecting outward from a bottom surface 802 of the sample holder 102. As multiple sample holders 102 are vertically stacked, the pins 800 of one sample support structure 102 rests on a top surface of another sample support structure 102 to define a gap 804 between respective sample holders 102 into which the taut samples can be positioned without contact with the top sample support structure 102, as shown in FIG. 8B. In another example shown in FIGS. 9A and 9B, the sample holder 102 can include a rim 900 defining an aperture 902 on a bottom surface of the sample holder 102. The rim 900 can be included in addition to or in the absence of the pins 800. As multiple sample holders 102 are vertically stacked, the rim 900 of one sample holder 102 can rest on the top surface of another sample holder 102 to provide a vertically-stacked arrangement of sample holders 102. The vertically-stacked arrangement can provide a cavity over the bottom sample holder 102 via the positioning of the aperture 902 into which the taut sample can be positioned without contact with the top sample holder 102, as shown in FIG. 9B. In implementations, the laser ablation system can include a positioning system that incorporates a robotic arm having a vacuum attachment or other structure to draw a sample holder 102 from the top of the vertical stack of sample holders 102 and position the drawn sample holder 102 in proximity of the laser of the laser ablation system.

In implementations, the sample holder 102 can include a sample identifier to identify characteristics of the sample(s) held between the sampler holder base 104 and the piston 106. The sample identifier can include, but is not limited to, a barcode, a data matrix two-dimensional (2D) barcode, an RFID tag, or other identifier that is associated with the sample(s) in a computer system. For example, the sample identifier can be affixed to a bottom surface of the base 116 of the piston 106, a bottom surface of the sample holder base 104, other another area of the sample holder 102, or combinations thereof, to provide access to the sample identifier by an optical scanner or other identification device to scan the sample identifier and access data related to the sample via the computer system. The sample identifier can be associated with information such as an identification of the source object for the sample, a time of sampling, a date of sampling, a type of sample, a sample analysis protocol to be used when analyzing the sample (e.g., laser ablation conditions, ICP instrument conditions, chemical elements to be analyzed, etc.), and the like.

CONCLUSION

Although the subject matter has been described in language specific to structural features and/or process operations, it is to be understood that the subject matter defined in the appended claims is not necessarily limited to the specific features or acts described above. Rather, the specific features and acts described above are disclosed as example forms of implementing the claims.

What is claimed is:

1. A method for securing a thin, solid sample for laser ablation, the method comprising:
    securing a thin, solid sample with a sample holder system, the sample holder system configured to hold the thin, solid sample in a taut configuration between a piston and a sample holder base;
    introducing a coating to the sample holder system to cover at least a portion of the thin, solid sample in the taut configuration;
    ablating a blank sample holder system with the laser ablation system to provide a blank sample, the blank sample holder system including the coating and having no portions of the thin, solid sample thereon;
    transferring the sample holder system to a laser ablation system;
    ablating at least a portion of the thin, solid sample in the taut configuration with the laser ablation system to provide an ablated sample;
    analyzing the content of the blank sample via a sample analysis system;
    generating a signal corresponding to the content of the blank sample;
    analyzing content of the ablated sample via the sample analysis system;
    generating a signal corresponding to the content of the ablated sample; and
    subtracting the signal corresponding to the content of the blank sample from the signal corresponding to the content of the ablated sample.

2. The method of claim 1, wherein the sample holder base includes interior sidewalls defining an aperture into which at least a portion of the piston is configured to fit.

3. The method of claim 2, wherein the piston includes a base and a projection extending from the base, wherein at least a portion of the projection is configured to fit within the aperture of the sample holder base to press the thin, solid sample into the taut configuration.

4. The method of claim 3, wherein the projection includes sidewalls configured to fit within the aperture of the sample holder base, and wherein the sample holder system includes a gap defined by the sidewalls of the projection and the interior sidewalls of the sample holder base.

5. The method of claim 4, wherein sample holder system is configured to introduce a portion of the thin, solid sample into the gap defined by the sidewalls of the projection and the interior sidewalls of the sample holder base to hold the thin, solid sample in the taut configuration.

6. The method of claim 4, wherein the gap is from about 0 mm to about 1 mm.

7. The method of claim 1, wherein the sample holder system is configured to hold a thin, solid sample having a thickness from about 0.05 mm to about 1.5 mm.

8. The method of claim 1, wherein the sample analysis system includes at least one of inductively coupled plasma emission spectroscopy, inductively coupled plasma mass spectrometry, optical spectroscopy, laser-induced breakdown spectroscopy, and infrared spectrometry.

9. A method for securing a thin, solid sample for laser ablation, the method comprising:
    directing a laser from a laser ablation system onto a thin, solid sample in a taut configuration held in a taut configuration by a sample holder system to provide an ablated sample, the sample holder system configured to hold the thin, solid sample in the taut configuration between a piston and a sample holder base;
    transferring the ablated sample via a carrier gas to a sample analysis system;

analyzing the content of the ablated sample with the sample analysis system;

ablating a blank sample holder system with the laser ablation system to provide a blank sample, the blank sample holder system having no portions of the thin, solid sample thereon;

analyzing the content of the blank sample via the sample analysis system;

generating a signal corresponding to the content of the blank sample; and subtracting the signal corresponding to the content of the blank sample from the signal corresponding to the content of the ablated sample.

10. The method of claim 9, wherein the sample analysis system includes at least one of inductively coupled plasma emission spectroscopy, inductively coupled plasma mass spectrometry, optical spectroscopy, laser-induced breakdown spectroscopy, and infrared spectrometry.

11. The method of claim 9, wherein the sample holder base includes interior sidewalls defining an aperture into which at least a portion of the piston is configured to fit.

12. The method of claim 11, wherein the piston includes a base and a projection extending from the base, wherein at least a portion of the projection is configured to fit within the aperture of the sample holder base to press the thin, solid sample into the taut configuration.

\* \* \* \* \*